(12) United States Patent
Bertonnier et al.

(10) Patent No.: US 11,934,816 B2
(45) Date of Patent: Mar. 19, 2024

(54) METHOD FOR GENERATING AN EXECUTABLE FILE FROM A PARENT EXECUTABLE FILE TO PRODUCE A DERIVED CUSTOMER ITEM

(71) Applicant: THALES DIS FRANCE SA, Meudon (FR)

(72) Inventors: Damien Bertonnier, Meudon (FR); Nicolas Regnault, Meudon (FR); Valérie Martin, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 340 days.

(21) Appl. No.: 17/295,646

(22) PCT Filed: Nov. 21, 2019

(86) PCT No.: PCT/EP2019/082116
§ 371 (c)(1),
(2) Date: May 20, 2021

(87) PCT Pub. No.: WO2020/104601
PCT Pub. Date: May 28, 2020

(65) Prior Publication Data
US 2022/0004402 A1 Jan. 6, 2022

(30) Foreign Application Priority Data
Nov. 22, 2018 (EP) ..................................... 18306551

(51) Int. Cl.
*G06F 9/445* (2018.01)
*G06F 8/54* (2018.01)
(Continued)

(52) U.S. Cl.
CPC ............ *G06F 8/54* (2013.01); *G06F 9/44521* (2013.01); *G06F 12/0246* (2013.01);
(Continued)

(58) Field of Classification Search
CPC .......... G06F 8/443; G06F 8/4435; G06F 8/52; G06F 9/44521; G06F 9/44557; G06F 9/44578; G06F 12/0246; G06F 12/0253
(Continued)

(56) References Cited

FOREIGN PATENT DOCUMENTS

| EP | 3067795 A1 | 9/2016 |
|---|---|---|
| WO | WO2014044403 A2 | 3/2014 |

(Continued)

OTHER PUBLICATIONS

Common Criteria, Wikipedia, 2016, 9 pages, [retrieved on Jun. 23, 2023], Retrieved from the Internet: <URL:https://web.archive.org/web/20161214065046/https://en.wikipedia.org/wiki/Common_Criteria>.*

(Continued)

*Primary Examiner* — Geoffrey R St Leger
(74) *Attorney, Agent, or Firm* — The Jansson Firm; Pehr B. Jansson

(57) ABSTRACT

Generation of an executable file derived from a parent executable file having ranges of physical addresses referencing a binary code of at least one core feature (CR), a binary code of a set of native features (F), bytecodes of a set of java features (Pkg), by selecting at least one native feature from the set of native features to be removed, defining the range of physical addresses where the binary code of the selected native feature is stored, selecting at least one java feature from the set of java features to be relocated, and relocating the bytecodes of said at least one selected java feature in the defined range of physical addresses.

14 Claims, 4 Drawing Sheets

(51) Int. Cl.
*G06F 12/02* (2006.01)
*G06F 8/41* (2018.01)

(52) U.S. Cl.
CPC ........ *G06F 8/4435* (2013.01); *G06F 9/44557* (2013.01); *G06F 12/0253* (2013.01)

(58) Field of Classification Search
USPC ........................................................ 717/151
See application file for complete search history.

(56) References Cited

FOREIGN PATENT DOCUMENTS

WO     WO-2015149214 A1 * 10/2015 ............. G06F 21/14
WO       WO2017151546 A1    9/2017

OTHER PUBLICATIONS

PCT/EP2019/082116, International Search Report, dated Feb. 6, 2020 European Patent Office, P.B. 5818 Patentlaan 2 NL-2280 HV Rijswijk.
PCT/EP2019/082116, International Search Report, dated Feb. 6, 2020 European Patent Office, D-80298 Munich.

\* cited by examiner

METHOD FOR GENERATING AN EXECUTABLE FILE FROM A PARENT EXECUTABLE FILE TO PRODUCE A DERIVED CUSTOMER ITEM

TECHNICAL FIELD

The present invention relates to a method for generating an executable file from a parent executable file.

Such method may be used in a non-limitative example within the domain of certified secure elements.

BACKGROUND OF THE INVENTION

Secure elements may be used for a wide variety of products and can implement various kinds of technology features. As an example, a secure element can implement security features such as biometry, RSA (Rivest, Shamir, Adleman algorithm) and elliptic curves. An executable file comprises the code of said security features. As an example, a product can be a health card, or a driving license.

These executable file is generally stored in non volatile memory (NVM). Then, different versions of the secure element can be generated with different subsets of activated features. These different versions are usually designated as derived customer items, and the secure element from which they are derived is designated as a parent customer item. For example, a secure element that includes five different features may be used as a basis to derive several secure elements adapted to different customer requirements by removing one or several features.

For some secure elements with specific security features, it is sometimes mandatory to certify said secure element, for example using the Common Criteria for Information Technology Security Evaluation standard, ISO 15408. The certification process can be considered as a constraint during the production phase. It can take up to a year for a certification process to be concluded.

One problem of this prior art is that, when a given parent customer item is certified, the certification process should also be performed on the derived customer items derived from said parent customer item, which implies time and effort required to certify said derived customer items.

SUMMARY OF THE INVENTION

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

It is an object of the invention to provide a method generating an executable file derived from a parent executable file, which permits minimizing the time and effort required by testing and certifying a derived customer item, in which said executable file is embedded.

To this end, there is provided a method for generating an executable file, derived from a parent executable file, said parent executable file comprising ranges of physical addresses referencing:
a first binary code of at least one core feature;
a second binary code of a set of native features;
bytecodes of a set of java features;
said method comprising:
selecting at least one native feature from said set of native features to be removed;
defining the range of physical addresses where the second binary code of said at least one selected native feature is stored;
selecting at least one java feature from said set of java features to be relocated;
relocating the bytecodes of said at least one selected java feature in said defined range of physical addresses.

Said executable file is designated as derived executable file.

As we will see in further details, as the execution file derived from the parent executable file, is only a modified parent executable file where one or a plurality of native features have been removed, the physical addresses of the first binary code of the at least one core feature and the second binary code of the remaining native features of the set of native features have not changed, and thus the first binary code and the second binary code have not been modified. Therefore, the certification of a secure element in which said parent executable file is embedded may be automatically applied to another secure element in which said derived executable file is embedded, without having another certification process to be performed for said another secure element.

According to non-limitative embodiments of the invention, the method in accordance with the invention further comprises the following characteristics.

In a non-limitative embodiment, said at least one core feature and said set of native features comprise a native code, and said set of java features comprises the java code of at least one java package.

In a non-limitative embodiment, said first binary code, said second binary code and said bytecodes are generated by compiling a source code comprising said at least one core feature, said set of native features and said set of java features.

In a non-limitative embodiment, said at least one core feature is not removable.

In a non-limitative embodiment, the relocating is performed according to the bytecodes' size of said at least one selected java feature and the defined range of physical addresses' size.

In a non-limitative embodiment,
said set of native of features comprises a plurality of native features;
said set of java features comprises a plurality of java features.

In a non-limitative embodiment, a plurality of native features is selected to be removed.

In a non-limitative embodiment, the bytecodes of a plurality of java features is relocated.

In a non-limitative embodiment, said method further comprises compacting the bytecodes of the java feature(s) which are not relocated.

In a non-limitative embodiment, the range(s) of physical addresses freed by the bytecodes compacting is reserved for user data.

In a non-limitative embodiment, the parent executable file is embedded in a non-volatile memory of a secure element designated as a parent customer item.

In addition, there is provided an executable file, wherein said executable file is generated according to the method characterized according to any characteristics above-mentioned.

In addition, there is provided a method for producing a secure element designated as a derived customer item, said secure element comprising a non-volatile memory, wherein said method comprises the loading of an executable file generated according to the method of any above-mentioned characteristics, in said non-volatile memory of said secure element.

In a non-limitative embodiment, said non-volatile memory is a flash memory.

In a non-limitative embodiment, said secure element is an integrated circuit card.

In addition, there is provided a secure element designated as a derived customer item, which is produced by the method above-mentioned.

In a non-limitative embodiment, said secure element is an integrated circuit card.

To achieve those and other advantages, and in accordance with the purpose of the invention as embodied and broadly described, the invention proposes a method for generating an executable file derived from a parent executable file, said parent executable file comprising ranges of physical addresses referencing:
  a second binary code of at least a native feature which is removable from the parent executable file;
  bytecodes of at least a java feature;
  wherein during the generation of the derived executable file:
    selecting at least one native feature from said set of native features to be removed;
    defining the range of physical addresses where the second binary code of said at least one selected native feature is stored in the parent executable file;
    selecting at least one java feature from said set of java features to be relocated;
    in the generated derived executable file, relocating the bytecodes of said at least one selected java feature in said defined range of physical addresses according to a predefined optimization relocation algorithm.

In a various method of the present invention, the ranges of physical addresses of said parent executable file reference a first binary code of at least one core feature which is not removable from the parent executable file, and wherein said at least one core feature is not removable from the derived executable file and wherein the first binary code is stored in the derived executable file in the same range of physical addresses than in the parent executable file.

In a various method of the present invention, the relocating process is performed according to the size of the bytecodes to be relocated and the size of the defined range of the physical addresses.

In a various method of the present invention, the bytecodes of the java feature(s) which are not relocated is compacted.

In a various method of the present invention, the range(s) of physical addresses freed by the compacted bytecodes (314) is reserved for user data.

In a various method of the present invention, the parent executable file is loaded in a non-volatile memory.

In a various method of the present invention, the generated derived executable file is loaded in a non-volatile memory of a secure element designated as a derived customer item.

In a various method of the present invention, the non-volatile memory is a flash memory.

In a various method of the present invention, a native feature F is selected to be removed when there is no dependency between said native feature and another native feature.

In a various method of the present invention, a java feature is selected for relocation when its bytecodes can be shifted in memory in any range of physical addresses without considering the other bytecodes of the other java features.

In a various method of the present invention, the native feature to be removed is overwritten by the relocation of the bytecodes or deleted before the relocation process.

BRIEF DESCRIPTION OF THE DRAWINGS

Some embodiments of methods and/or apparatus in accordance with embodiments of the present invention are now described, by way of example only, and with reference to the accompanying drawings, in which.

DESCRIPTION OF EMBODIMENTS OF THE INVENTION

Figure 1:
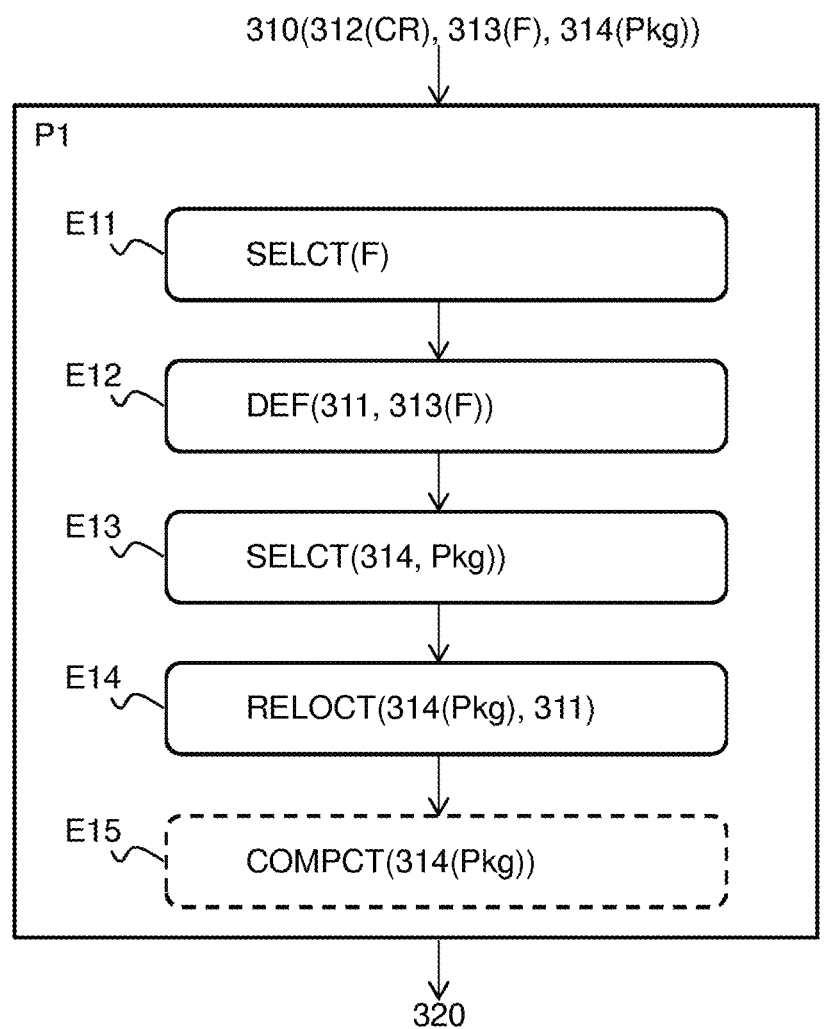
FIG. 1 is an organizational chart of a method for generating an executable file derived from a parent executable file, according to a non-limitative embodiment of the invention.

Throughout the figures, the same reference numerals and characters, unless otherwise stated, are used to denote like features, elements, components or portions of the illustrated embodiments.

In the following description, numerous specific details are set forth.

However, it is understood that well-known circuits, structures, techniques functions or constructions by the man skilled in the art are not described in detail since they would obscure the invention in unnecessary detail.

The present invention relates to a method P1 for generating an executable file 320 derived from a parent executable file 310.

In a non-limitative embodiment, the parent executable file 310 is in the HEX format. As will be described in the following, one or several portions of the parent execution file 310 corresponding to some native feature(s) F to be removed are replaced by bytecodes 324 of java features Pkg.

Figures 2, 3, 4, 5, 6:
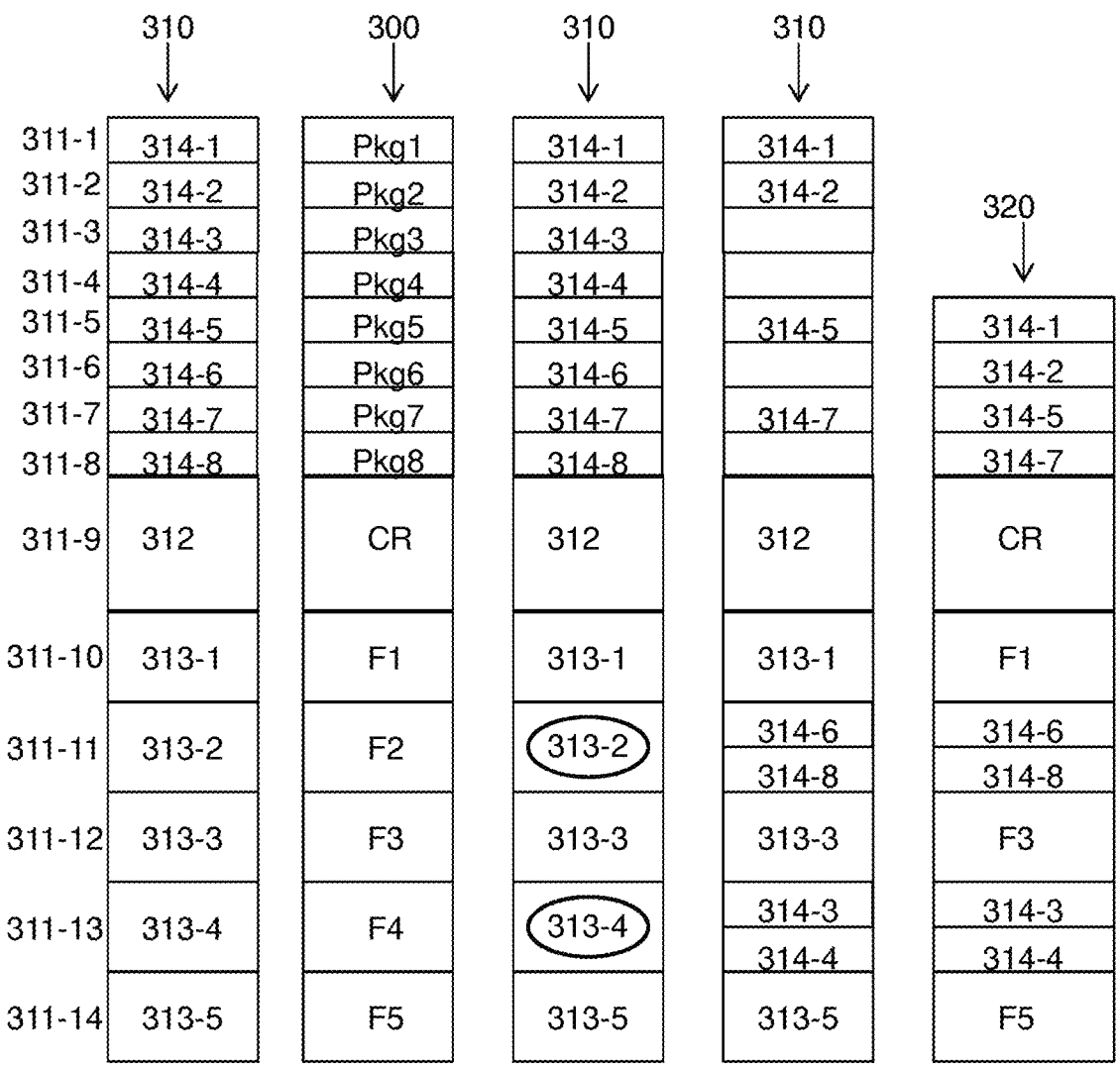
FIG. 2 illustrates a diagram of a parent executable file from which an executable file is derived according to the method of FIG. 1, said parent executable file comprising a first binary code of a core feature, a second binary code of a set of native features, and bytecodes of java features, in a non limitative embodiment.
FIG. 3 illustrates a diagram of a source code from which the parent executable file of FIG. 2 is generated.
FIG. 4 illustrates a diagram of the parent executable file of FIG. 2, wherein the binary code corresponding to two native features has been removed, according to the method of FIG. 1, in a non-limitative embodiment.
FIG. 5 illustrates a diagram of the parent executable file of FIG. 4, wherein the bytecodes of five java features have been relocated, according to the method of FIG. 1, in a non-limitative embodiment.
FIG. 6 illustrates a diagram of the parent executable file of FIG. 5, wherein the bytecodes of some java features which have not been relocated have been compacted for producing a derived executable file, according to the method of FIG. 1, in a non-limitative embodiment.

As illustrated in FIG. 2, the parent executable file 310 comprises ranges 311 of physical addresses referencing:
- a first binary code 312 of at least one core feature CR;
- a second binary code 313 of a set of native features F;
- bytecodes 314 of a set of java features Pkg.

In the following, a set of native features or a native feature will be referenced F. In the following, a set of java features or a java feature will be referenced Pkg.

In a non-limitative embodiment, the set of native features F comprises one or a plurality of native features. In the non-limitative illustrated example in FIG. 2 and FIG. 3, the parent executable file 310 comprises the second binary code 313-1 to 313-5 of five native features F1 to F5.

In non-limitative examples:
- a first native feature F1 implements RSA algorithm;
- a second native feature F2 implements an error correcting codes EXX algorithm.
- a third native feature F3 implements RSA on-board key generation OBKG algorithm.

In a non-limitative embodiment, the set of java features Pkg comprises one or a plurality of java features Pkg. In the non-limitative illustrated example in FIG. 2 and FIG. 3, the parent executable file 310 comprises the bytecodes 314-1 to 314-8 of eight java features Pkg-1 to Pkg-8.

The parent executable file 310 is obtained by:
- compiling a source code 300 illustrated in FIG. 3 comprising said at least one core feature CR, the set of native features F and the set of java features Pkg, said compiling resulting in said first binary code 312, said second binary code 313 and said bytecodes 314. Hence, the first binary code 312 is the compiled code of the at least one core feature CR, the second binary code 313 is the compiled code of the set of native features F and the bytecodes 314 are the compiled code of the set of java features Pkg. In a non-limitative embodiment, the compiling generates an object file .obj comprising said first binary code 312 and said second binary code 313, and a .jca file comprising said bytecodes 314;
- linking the object file .obj and the .jca file with said ranges 311 of physical addresses resulting in the parent executable file 310. The parent executable file 310 comprises the ranges 311 of physical addresses illustrated in FIG. 2 where the codes (first binary code 312, second binary code 313, and bytecodes 314) are positioned. In a non-limitative embodiment, the ranges 311 of physical addresses are contiguous. Hence, after the linking, different ranges 311 of physical addresses are related to the different codes.

It is to be noted that the ranges 311 of physical addresses are those of the non-volatile memory NVM described in the following, where the parent executable file 310 is loaded. It is further to be noted that the first range 311-1 of physical addresses depends on the location where the parent executable file 310 is loaded in the non-volatile memory NVM.

In this description, a distinction is made between core features CR which are mandatory components for the source code 300, and non-core features which are optional components that may be removed from the parent executable file 310 to obtain a derived executable file 320 described in the following. Unless explicitly mentioned, a native feature refers to a non-core feature.

The core features CR are implementing the minimum functionalities to be embedded in a secure element 11 which is a parent secure element, also designated as a parent customer item or in a secure element 12 which is derived from said parent customer item and designated as a derived secure element or as a derived customer item.

In a non-limitative embodiment, said at least one core feature CR and the set of native features F comprise a native code, and the set of java features Pkg comprises the java code of at least one java package. A java package Pkg is a library.

Native code refers to programming code that is configured to run on a specific processor. In a non-limitative example, the native code is in C code or assembly code.

Bytecodes of the java code are interpreted by a Java Virtual Machine into code that will run on computer hardware.

The parent executable file 310 is a computer program product which is embedded in a secure element 11 designated as parent customer item. The parent executable file 310 generated for the parent customer item 11 can be used as a basis to produce executable files, designated as derived executable files, for derived customer items 12.

In a non-limitative element, said secure element 11 is an integrated circuit card ICC also designated as ICC card in the following. The ICC card may be contact or contactless.

In non-limitative embodiments, the ICC card is a smart device, a soldered element, a M2M module, an eSE (embedded secure element), a micro-SD etc.

In non-limitative examples, the ICC card is a banking card, such as an EMV card, an Electronic Identity Card, a health card, a driving license, a passport, a privacy card, a financial service card, an access card etc.

It is to be noted that secure elements are able to control the access to the data they contain and to authorize or not the use of data by other machines. Secure elements may also provide computation services based on cryptographic components. In general, secure elements have limited computing resources and are intended to be connected to a host machine. Secure elements may be removable or fixed to a host device.

Figure 7:
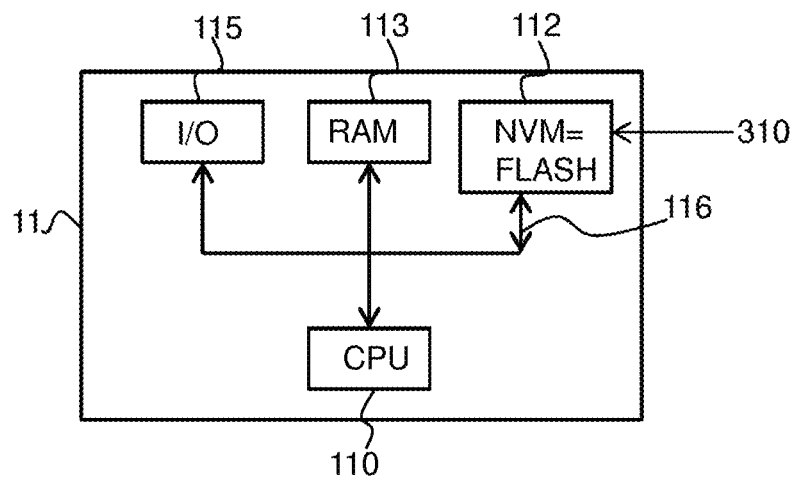
FIG. 7 illustrates an architecture of a parent secure element in which said parent executable file of FIG. 2 is embedded, in a non limitative embodiment.

FIG. 7 is a non-limitative embodiment of an architecture of said secure element 11. It comprises:
- a central processing unit (CPU) 110;
- a non-volatile memory (NVM) 112;
- a random access memory (RAM) 113;
- a communication interface (I/O) 115 for receiving input and placing output to a computer network, e.g., the Internet, to which the secure element 11 may be connected, either directly or via intermediary devices, such as a host computer. These various components are connected to one another, for example, by a bus 116;
- a Java Virtual Machine (JVM) 117.

In a non-limitative embodiment illustrated in FIG. 7, the non-volatile memory NVM is a FLASH memory.

In a non-limitative embodiment, the parent executable file 310, is embedded in the secure element 11, designated as parent customer item, and is stored in the non-volatile memory NVM. In a non-variant of embodiment, it is stored in the FLASH memory. In other non-variant of embodiment, it is stored in other types of non-volatile memory.

Figure 9A:
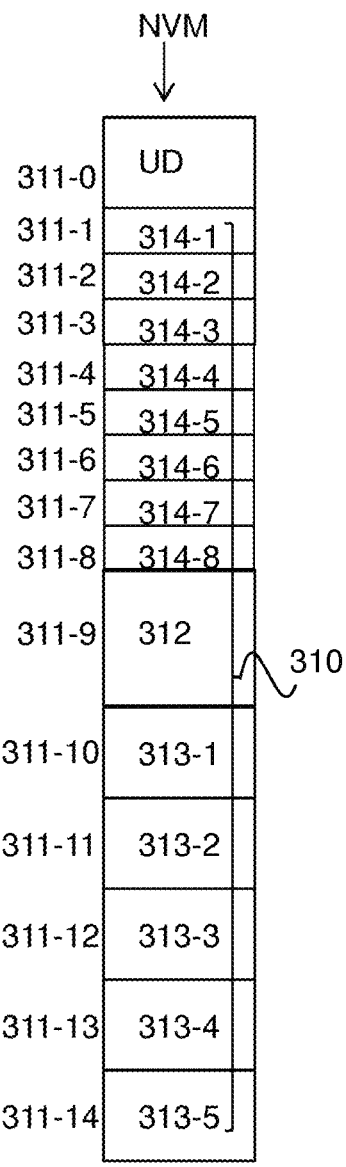
FIG. 9*a* illustrates a non-volatile memory of the parent secure element of FIG. 7, in a non-limitative embodiment.

A non-limitative example of the non-volatile memory NVM where the parent executable file 310 is loaded is illustrated in FIG. 9a. As illustrated, it comprises the parent executable file 310 within the ranges 311-1 to 311-14 and a memory space for the user data UD in the range 311-10 of physical addresses.

In a non-limitative embodiment, the non-volatile memory NVM comprises the Java Virtual Machine JVM.

During operation, the CPU 110 executes the instructions of the different codes (first binary code 312, second binary code 313) stored in the stored in the non-volatile memory NVM, and the Java Virtual Machine JVM interprets the bytecodes 314 stored in the non-volatile memory NVM.

The executable file 320, designated as derived executable file, which is derived from the parent executable file 310, comprises:
- the first binary code 312 of said at least one core feature CR;
- a second binary code 313 of a sub-set of the set of native features F of the parent executable file 310;
- bytecodes 314 of said set of java features Pkg of the parent executable file 310.

Such an executable file 320 is illustrated in FIG. 6, in a non-limitative embodiment. It results from a modification of the parent executable file 310 where at least one native feature F has been removed, that is to say where the corresponding second binary code 313 has been replaced.

The method P1 for generating such an executable file 320 derived from the parent executable file 310 is illustrated in FIG. 1. It comprises the following steps:

In step E11), illustrated SELCT(F), at least one native feature F from the set of native features is selected to be removed.

In the non-limitative embodiment, a plurality of native features F is selected to be removed. In the non-limitative example illustrated in FIG. 4, the native features F2 and F4 are selected. In FIG. 4 the native features F2 and F4 are circled to show their selection.

It is to be noted that the core features CR are not removable. Therefore, the first binary code 312 will be stored in the derived executable file 320 in the same range 321 of physical addresses than in the parent executable file 310.

It is to be noted that if there is a dependency between a native feature F and another native feature F, it can't be selected to be removed. The word "dependency" should be understood as a functional link between two native features F. These functional links are introduced by instructions in the source code 300, for example "call" or "jump" instructions.

In step E12), illustrated DEF(311, 313(F)), the range 311 of physical addresses where the second binary code 313 of said at least one selected native feature F is stored, is defined.

In the non-limitative example illustrated in FIG. 2 and FIG. 3, the second binary codes 313-2 and 313-4 of the native features F2 and F4 are stored within the ranges 311-11 and 311-13 of physical addresses. It is to be reminded that the storage in said ranges 321-2 and 321-4 has been defined from the linking process.

In step E13), illustrated SELCT(314, Pkg)), at least one java feature Pkg from the set of java features to be relocated is selected.

In a non-limitative embodiment, the bytecodes 314 of a plurality of java features Pkg is selected to be relocated. In a non-limitative example, the java features Pkg-3, Pkg-4, Pkg-6, and Pkg-8 are selected.

It is to be noted that a java feature Pkg which can be relocated has no dependency with other java feature Pkg. The word "dependency" should be understood as a functional link between two java features Pkg. These functional links are introduced by calling in the source code 300, the name of the java feature Pkg.

Hence, when there are a plurality of java features Pkg, the java features Pkg which are relocatable are independent from each other, which means that their bytecodes 314 can be shifted in memory in any range 311 of physical addresses without considering the other bytecodes 314 of the other java features Pkg.

In step E14), illustrated RELOCT(314(Pkg), 311), the bytecodes 314 of said at least one selected java feature Pkg are relocated in said defined range 311 of physical addresses.

In a non-limitative embodiment, the bytecodes 314 of a plurality of java features Pkg are relocated. In the non-limitative example illustrated in FIG. 5, the bytecodes 314-3, 314-4, 314-6, and 314-8 respectively of the java features pkg3, pkg4, pgk6 and Pkg8 are relocated.

In a non-limitative embodiment, the relocating is performed according to the bytecodes' size of said at least one selected java feature Pkg and the defined range 311 of physical addresses' size.

In a non-limitative embodiment, the relocating is performed according to the Best Fit algorithm well-known by the man skilled in the art. It permits to optimize the relocating.

Hence, in the non-limitative example illustrated in FIG. 5, according to the size of the range 311-11 of physical addresses and the range 311-13 of physical addresses, and to the size of the bytecodes 314-3, 314-4, 314-6, and 314-8, the bytecodes 314-3, 314-4 fit in the range 311-13 of physical addresses and therefore are relocated in said range 311-13, and the bytecodes 314-6, and 314-8 fit in the range 311-11 of physical addresses and therefore are relocated in said range 311-11.

It is to be noted that after the relocating, there may be some part of the second binary code 313 of the native feature(s) F (which has been selected to be removed), which has not been overwritten by the relocation of the bytecodes 314 and which is left in the defined range 311 of physical addresses. This part of second binary code 313 is a dead code because it won't be called anymore.

In a non-limitative embodiment, before the relocating, the second binary code 313 of said at least one selected native feature F may be deleted from said parent executable file 310. In another non-limitative embodiment, after the relocating, the part of the second binary code 313 which is left may be deleted from said parent executable file 310, part which has not been overwritten by the relocating of the bytecodes 314. The deleting may be performed by filling with bits 0 or 1 the range 311 of physical addresses corresponding to said part left.

In step E15) illustrated COMPACT(314(Pkg), when the bytecodes 314 of the selected java feature(s) Pkg have been relocated, in a non-limitative embodiment, the method P1 further comprises compacting the bytecodes 314 of the java features Pkg which are not relocated. As this step is non mandatory, it is illustrated in dotted line in FIG. 1.

It permits to free some memory space.

In a non-limitative embodiment, the range(s) 311 of physical addresses freed by the bytecodes 314 compacting is reserved for user data UD in the non-volatile memory NVM where the derived executable file 320 is loaded, that is to say data which are specific to the user of the derived customer item 12. In non-limitative examples, user data UD comprise a picture, a signature, the name, address, age of the user etc.

In a non-limitative example illustrated in FIG. 6, when the bytecodes 314-3, 314-4, 314-6, and 314-8 of the java features Pkg3, Pkg4, Pkg6, and Pkg8 have been relocated, it has made:
- some memory space available in the ranges 311-3 and 311-4 of physical addresses between the bytecodes 314-2 and 314-5 of the remaining java features Pkg2 and Pkg5;
- some memory space available in the range 311-6 of physical addresses;
- some memory space available in the 311-8 of physical addresses;

FIG. 6 illustrated the result of the compacting step which produces the derived executable file 320 which is loaded in a secure element for producing a derived customer item. As illustrated, the derived executable file 320 is smaller than the parent executable file 310 due to the compacting.

It is to be noted that if the method P1 comprises no compacting step, the derived executable file 320 generated is the one illustrated in FIG. 5, that is to say it results from the step E14.

By compacting the bytecodes 314 of the remaining java features Pkg, it increases the memory space available for the user data UD in the non-volatile memory NVM in which the derived executable file 310 is loaded.

Figure 9B:
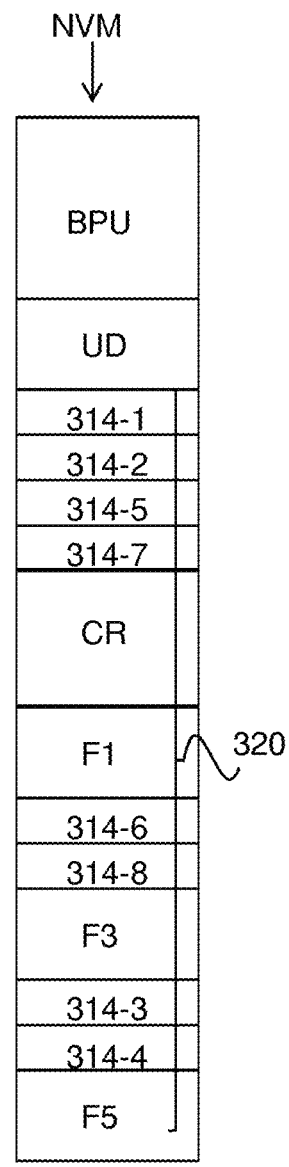
FIG. 9*b* illustrates a non-volatile memory of the parent secure element of FIG. 8, in a non-limitative embodiment.

A non-limitative example of the non-volatile memory NVM where the derived executable file 320 is loaded is illustrated in FIG. 9b. As illustrated, it comprises the derived executable file 320, some user data UD, and some added memory space BPU where more user data UD can be added.

This memory space brings an added value to the derived customer item 12 and this can be monetized. For a predetermined size of non-volatile memory NVM, removing unnecessary native features F allows to maximize the size of the user data memory by adding unused memory to it and therefore increase the revenue generated while selling the derived customer item 12.

Figure 10:
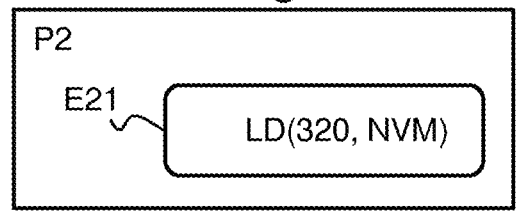
FIG. 10 is an organizational chart of a method for producing a secure element in which said derived executable file of FIG. 8 is embedded, according to a non-limitative embodiment of the invention.

A method P2 for producing a secure element 12, designated as derived customer item, said secure element 12 comprising a non-volatile memory NVM, is illustrated in FIG. 10. Said method P2 comprises the loading (step E21 illustrated LD(320, NVM)) of said executable file 320 in said non-volatile memory NVM of said secure element 12. Thus, a derived customer item 12 is produced from the parent customer item 11 in which the parent executable file 310 is embedded.

The description made for the secure element 11 is applied for the secure element 12.

In a non-limitative embodiment, as the same manner than the secure element 11, the secure element 12 is an integrated circuit card ICC.

Figure 8:
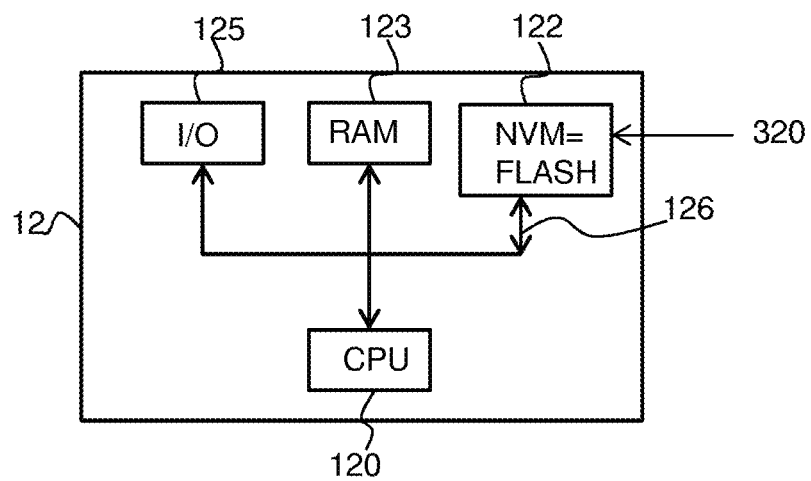
FIG. 8 illustrates an architecture of a derived secure element in which said derived executable file of FIG. 6 is embedded, in a non limitative embodiment.

FIG. 8 is a non-limitative embodiment of architecture of said secure element 12. It comprises:
- a central processing unit (CPU) 120;
- a non-volatile memory (NVM) 122;
- a random access memory (RAM) 123;
- a communication interface (I/O) 125 for receiving input and placing output to a computer network, e.g., the Internet, to which the secure element 11 may be connected, either directly or via intermediary devices, such as a host computer. These various components are connected to one another, for example, by a bus 126;
- a Java Virtual Machine (JVM) 127.

In a non-limitative embodiment illustrated in FIG. 8, the non-volatile memory NVM is a FLASH memory.

In a non-limitative embodiment, the derived executable file 320, is embedded in the secure element 12 and is stored in the non-volatile memory NVM. In a non-variant of embodiment, it is stored in the FLASH memory. In other non-variant of embodiments, it is stored other types of non-volatile memory.

In a non-limitative embodiment, the non-volatile memory NVM comprises the Java Virtual Machine JVM.

During operation, the CPU 120 executes the instructions of the different codes (first binary code 312, second binary code 313) stored in the stored in the non-volatile memory NVM, and the Java Virtual Machine JVM interprets the bytecodes 314 stored in the non-volatile memory NVM.

Hence, with the derived executable file 320, a secure element 12, designated as derived customer item, is derived from the parent customer item 11.

Hence, a plurality of derived customer items 12 comprising different combinations of native features F can be produced in this manner.

Hence, thank to the generation of the derived executable file 320 described, the compilation of the source code 300 and the linking of the object file .obj and the .jca file is performed only one time and for all the customer items, whether it is a parent customer item 11 or a derived customer item 12.

If the parent customer item 11 embedding this parent executable file 310 is tested and certified, all derived customer items 12 derived from this parent customer item 11 will be considered as already tested and certified.

During the certification process, only the features (java, native and core) of the derived customer item 12 are checked and compared to the features (native and core) of the parent customer item 11. Therefore, if some native features F of the parent customer item 11 are removed from the derived customer item 12, there is no consequence for the certification process.

For the certification process, the native code (of the core feature(s) CR and of the native feature(s) F) checked must be the same, and its related ranges 311 of physical addresses must be the same. It is to be noted that even if only one related range 311 of physical addresses is changed, it implies that the native code is modified, as the call from one native feature F for example will be modified when it calls another native feature F which related range 311 of physical addresses (where its second binary code 313 is positioned) has been modified.

For the certification process, the java code (of the java feature(s) Pkg) checked must also be the same. But, if it is relocated, there is no consequence regarding the java code. It is not modified, as the dependency between different java features Pkg is implemented according to the calling of the name of the java feature Pkg. The Java Virtual Machine JVM interprets the dependency according to a table of the ranges 311 of physical addresses which are related to the different java features Pkg. When a java feature Pkg is relocated, this table is updated with the new corresponding ranges 311 of physical addresses.

It is to be understood that the present invention is not limited to the aforementioned embodiments.

Hence, some embodiments of the invention may comprise one or a plurality of the following advantages:

it allows producing different versions of a secure element, based on the same hardware platform, but taking into account the needs of different customers or applications. The production process is fast, as there is no re-compilation of re-linking required for the derived customer items 12. Furthermore, it is not anymore required to re-test and re-certify the derived customer items 12 if the parent customer item 11 is already certified;

it avoids performing re-compilation and re-linking for derived customer items 12 at product generation time or on the field for personalizing products;

it permits to produce some derived customer items 12 when the secure element doesn't comprise any memory management unit designated as MMU, such MMU allowing the linking of virtual addresses to an object file and the mapping of said virtual addresses with ranges of physical addresses;

memory manufacturers are sometimes selling their product (the non-volatile memory NVM) using pay-per-use billing (also referred as bill-per-use, BPU). This means that the selling price of the memory will depend on the amount of the memory that is really used by a secure element. Therefore, by removing unnecessary native features F, the unused memory space is optimized and the production cost of a derived customer item 12 is reduced.

The invention claimed is:

1. A method for generating an executable file to be loaded in a non-volatile memory of a secure element, said executable file being derived from a parent executable file, said parent executable file comprising ranges of physical addresses referencing:

a second binary code of at least a native feature which is removable from the parent executable file;

bytecodes of at least a java feature;

wherein during the generation of the derived executable file:

selecting at least one native feature from a set of native features to be removed;

defining the range of physical addresses where the second binary code of said at least one selected native feature is stored in the parent executable file;

selecting at least one java feature from a set of java features to be relocated;

in the generated derived executable file, relocating the bytecodes of said at least one selected java feature in said defined range of physical addresses according to a predefined optimization relocation algorithm.

2. The method according to claim 1, wherein ranges of physical addresses of said parent executable file reference a first binary code of at least one core feature which is not removable from the parent executable file, and wherein said at least one core feature is not removable from the derived executable file and wherein the first binary code is stored in the derived executable file in the same range of physical addresses as in the parent executable file.

3. The method according to claim 1, wherein the relocating process is performed according to the size of the bytecodes to be relocated and the size of the defined range of the physical addresses.

4. The method according to claim 1, further comprising the step of compacting bytecodes of java feature(s) which are not relocated.

5. The method according to claim 4, wherein range(s) of physical addresses freed by the compacted bytecodes are reserved for user data.

6. The method according to claim 1, wherein the parent executable file is loaded in a non-volatile memory.

7. The method according to claim 6, wherein said non-volatile memory is a flash memory.

8. The method according to claim 1, wherein said method comprising the loading of the derived executable file in a non-volatile memory of a secure element designated as a derived customer item.

9. The method according to claim 8, wherein said secure element is an integrated circuit card.

10. The method according to claim 1, wherein the parent executable file is loaded in a secure element designated as a parent customer item.

11. The method according to claim 1, wherein a native feature is selected to be removed when there is no dependency between said native feature and another native feature.

12. The method according to claim 1, wherein a java feature is selected for relocation when its bytecodes can be shifted in memory in any range of physical addresses without considering other bytecodes of other java features.

13. The method according to claim 1, wherein the native feature to be removed is overwritten by the relocation of the bytecodes of said at least one selected lava feature or deleted before the relocation process.

14. The method according to claim 1, wherein a core feature and a native feature comprise a native code, and said set of java features comprises java code of at least one java package.

* * * * *